US011246296B2

(12) United States Patent
Xu et al.

(10) Patent No.: US 11,246,296 B2
(45) Date of Patent: Feb. 15, 2022

(54) ELECTRIC POWERED BIRD BATH

(71) Applicant: Evergreen Enterprises of Virginia, LLC, Richmond, VA (US)

(72) Inventors: Ting Xu, Richmond, VA (US); Kristina Sarullo, Richmond, VA (US); Jordan Cai, Zhejiang Ningbo (CN)

(73) Assignee: Evergreen Enterprises of Virginia, LLC, Richmond, VA (US)

(*) Notice: Subject to any disclaimer, the term of this patent is extended or adjusted under 35 U.S.C. 154(b) by 118 days.

(21) Appl. No.: 16/460,099

(22) Filed: Jul. 2, 2019

(65) Prior Publication Data
US 2021/0000082 A1 Jan. 7, 2021

(51) Int. Cl.
| | | |
|---|---|---|
| *A01K 45/00* | (2006.01) | |
| *F21V 33/00* | (2006.01) | |
| *F21S 9/03* | (2006.01) | |
| *H02S 99/00* | (2014.01) | |
| *F21Y 115/10* | (2016.01) | |

(52) U.S. Cl.
CPC ............ *A01K 45/002* (2013.01); *F21S 9/03* (2013.01); *F21V 33/006* (2013.01); *F21Y 2115/10* (2016.08); *H02S 99/00* (2013.01)

(58) Field of Classification Search
CPC ........ A01K 45/002; F21S 9/03; F21V 33/006; F21Y 2115/10; H02S 99/00; Y02E 10/50
See application file for complete search history.

(56) References Cited

U.S. PATENT DOCUMENTS

| | | | |
|---|---|---|---|
| 1,114,264 A * | 10/1914 | Hoyle | A01K 45/002 |
| | | | 119/69.5 |
| 2,005,602 A | 6/1935 | Thomson | |
| 2,887,988 A | 5/1959 | Cottongim | |
| D301,776 S | 6/1989 | Ochs | |
| 5,743,212 A | 4/1998 | Forjohn | |
| 5,782,035 A | 7/1998 | Locke et al. | |
| 5,918,415 A | 7/1999 | Locke et al. | |
| 6,179,218 B1 | 1/2001 | Gates | |
| D441,921 S | 5/2001 | DiGiacomo, Jr. | |
| D448,125 S | 9/2001 | Ranly | |
| D451,250 S | 11/2001 | Chrisco et al. | |
| 6,708,443 B2 | 3/2004 | Hall | |
| D495,099 S | 8/2004 | Fort, II | |
| 6,799,533 B2 | 10/2004 | Flowers et al. | |

(Continued)

FOREIGN PATENT DOCUMENTS

CN 110679516 A * 1/2020

*Primary Examiner* — Anabel Ton
(74) *Attorney, Agent, or Firm* — Troutman Pepper Hamilton Sanders LLP; Christopher C. Close, Jr.

(57) ABSTRACT

Aspects of the present disclosure relate to a bird bath. In one configuration, a frame as a plurality lighting elements therein. A stand is provided for supporting the frame. The bath may include a control component for controlling the lighting elements and a photovoltaic cell for providing power to the lighting elements. In another aspect, the frame may include a plurality of spiral frame members. In yet another aspect, the spiral members have a channel pathway and the lighting elements are disposed in the channel pathway. In yet another aspect, the frame may includes a plurality of radial members. In yet another aspect, the radial members have a channel pathway and the lighting elements are disposed in the channel pathway.

11 Claims, 8 Drawing Sheets

(56) References Cited

U.S. PATENT DOCUMENTS

| | | |
|---|---|---|
| 6,895,895 B2 | 5/2005 | Reusche et al. |
| 7,530,330 B1 | 5/2009 | Valle |
| 8,381,682 B2 | 2/2013 | Bradley |
| 8,514,094 B2 | 8/2013 | Richmond |
| 10,228,102 B2 * | 3/2019 | Wang ............... F21V 33/00 |
| 10,228,122 B2 | 3/2019 | Wang |
| 2005/0121072 A1 | 6/2005 | Stengel |
| 2005/0133088 A1 | 6/2005 | Bologeorges |
| 2008/0035068 A1 | 2/2008 | Gou |
| 2009/0159261 A1 | 6/2009 | Lira et al. |
| 2010/0090020 A1 | 4/2010 | Thompson |
| 2016/0309680 A1 | 10/2016 | Blohm |
| 2017/0016593 A1 | 1/2017 | Wang |

\* cited by examiner

ELECTRIC POWERED BIRD BATH

FIELD

The field of invention relates generally to baths, and more specifically, to a solar or electric powered bird bath.

BACKGROUND

Bird baths, backyard ponds, and pools, are highly-valued features of residential yards and gardens. As the pace of life continues to quicken, features such as these that draw one's attention to aesthetic pleasures and to nature become increasingly important to a person's well-being. A fountain placed in a bird bath, pond, or pool, may help to draw one's attention to that feature in an aesthetically pleasing manner.

A water fountain that is powered by an external electricity source, for example, requires wire installation that could involve burying wires in a lawn. Installation could also involve making water tight electrical seals and connections within the fountain. This creates the hazard of electrocution. A fountain powered by an external water source is connected to a garden hose, if not to hard line plumbing, which takes effort and know-how to install. And a fountain powered by batteries would need frequent battery replacement.

Many challenges exist for a solar-powered water fountain, to successfully apply the disparate arts of solar electricity and apparatuses useful as bird bath fountains. For example, a solar-powered electric motor would have to operate in a wet environment, which is well-known in the art to be detrimental to the life of the motor. Another problem is that solar cells are inherently unsightly. Another problem is that it is difficult for an electric motor to start-up under low voltage conditions, such as those conditions found in low sunlight. Further, solar cells can be expensive components, and the cost of the apparatus can be almost directly proportional to the cost of the solar cells.

SUMMARY

The following presents a simplified summary of certain features. The summary is not an extensive overview and is not intended to identify key or critical elements.

Aspects of the present disclosure relate to a bird bath. In one configuration of a bird bath, a frame with plurality of frame members has a plurality lighting elements therein. A stand is provided for supporting the frame. The bath may include a control component for controlling the lighting elements and a photovoltaic cell for providing power to the lighting elements. In another aspect, the frame may include a plurality of spiral frame members. In yet another aspect, the spiral members may have a channel pathway and the lighting elements are disposed in the channel pathway. In yet another aspect, the frame may include a plurality of radial members. In yet another aspect, the radial members may have a channel pathway and the lighting elements are disposed in the channel pathway.

In yet another aspect, the plurality of frame members includes a plurality of spiral members and radial members. In yet aspect, the spiral members may have a channel pathway and the lighting elements are disposed in the channel pathway. In yet another aspect, the radial members may have a channel pathway and the lighting elements are disposed in the channel pathway.

In yet another aspect, a removable basin is configured to interact with the frame. In yet another aspect, the removable basin comprises a light transmissive material. In other aspects, the bird bath may include a plurality of suction cups for holding a basin thereon. In other aspects, the bird bath may include a vibratory device for vibrating the frame.

In other aspects, the bird bath may include a wireless remote control for controlling the control component. In yet other aspects, the bird bath may include a rechargeable battery electronically connected to the control component and to the photovolatic cell. In yet other aspects, the bird bath may include a removable basin of light transmissive material and the photovoltaic cell can be disposed underneath the basin. In another aspect, the bird bath may include the frame having a plurality of circular members. In other aspects, the circular members have a channel pathway and the lighting elements are disposed in the channel pathway.

In yet other aspects, the bird bath may include a releasable connection device for maintaining a removable basin thereon. In one aspect, the releasable connection device further comprises a suction cup. In yet other aspects, the bird bath may further comprise a light transmissive basin being removably mounted on the frame and the frame including a vibratory device for vibrating the frame with basin.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith. Some features herein are illustrated by way of example, and not by way of limitation, in the figures of the accompanying drawings, in which like reference numerals refer to similar elements, and wherein:

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

FIGS. 1 through 10, illustrate various constructions of an electric powered bird bath 100, 1000. In one illustrative construction, the disclosed technology can be used for a solar-powered bird bath 100, 1000 and perform methods in which one or more photovoltaic sources (e.g., solar cells), capable of converting light energy into electrical energy, are positioned underneath a translucent basin (separated from water in the basin) and the electrical energy produced by the photovoltaic sources can provide the electrical energy for operating a lighting system that forms a desired light sequence. In another illustrative construction, the disclosed technology can be used for an electric powered bird bath 100, 1000 with stored battery electrical energy for operating a lighting system that forms a desired light sequence.

According to the present disclosure, the electric powered bird bath 100 may include a stand 110, a frame, 200 and a basin 300 (see FIG. 6) removably disposed on the frame 200. The stand 110 is connected to the frame 200 to support the basin 300 thereon. The frame 200 can be mechanically connected disposed on top of the stand 110 and/or could be part of stand 110. A solar cell or a photovoltaic cell 210 is configured to receive sunlight and provide energy to a rechargeable battery 212 (see FIG. 6). Upon being energized by the electric energy provided by the solar cell 210 and/or by electric energy provided by a rechargeable battery 212 that has been charged by such solar cells 210 or AC power, lights (such as, LED lights) can be illuminated or other parts of the solar-powered bird feeder 100 can operate. It is noted that the power can be in form of 110-240V Alternating Current, photovoltaic chip (solar cell) 210, battery cell, etc. If a photovoltaic chip 210 is used, the photovoltaic chip 210 uses a solar-powered light-controlled switch to store energy in daytime and provide electric energy for the light-emitting system in nighttime.

With reference to the frame 200 1200, it can be multiple different configurations. In one configuration, the frame 200 may be a three-dimensional spiral curve configuration in which the lateral spacing between the various spiral ribs/members 206 become smaller as the curves extends to solar cell 210 in the bottom center of the frame 200. In one configuration shown in FIGS. 7 and 8, the frame 1200 may have concentric circle members 1202 disposed at the same distance between each circle or distance between each circle increase from the circles closest the solar cell 1210 extend to the upmost edge of the frame 1200. In one configuration, the frame 1200 may have non-concentric circles members disposed at the same distance between each circle or distance between each circle increase from the circles closest the solar cell extend to the upmost edge of the frame 200. The close-packed circle members 1202 of the frame 200, 1200 provides for enhanced structure support of basin 300 due to concentration of the weight of water. The openings created by the frame members allow water to drain and reduces the weight of the frame.

Figure 1:
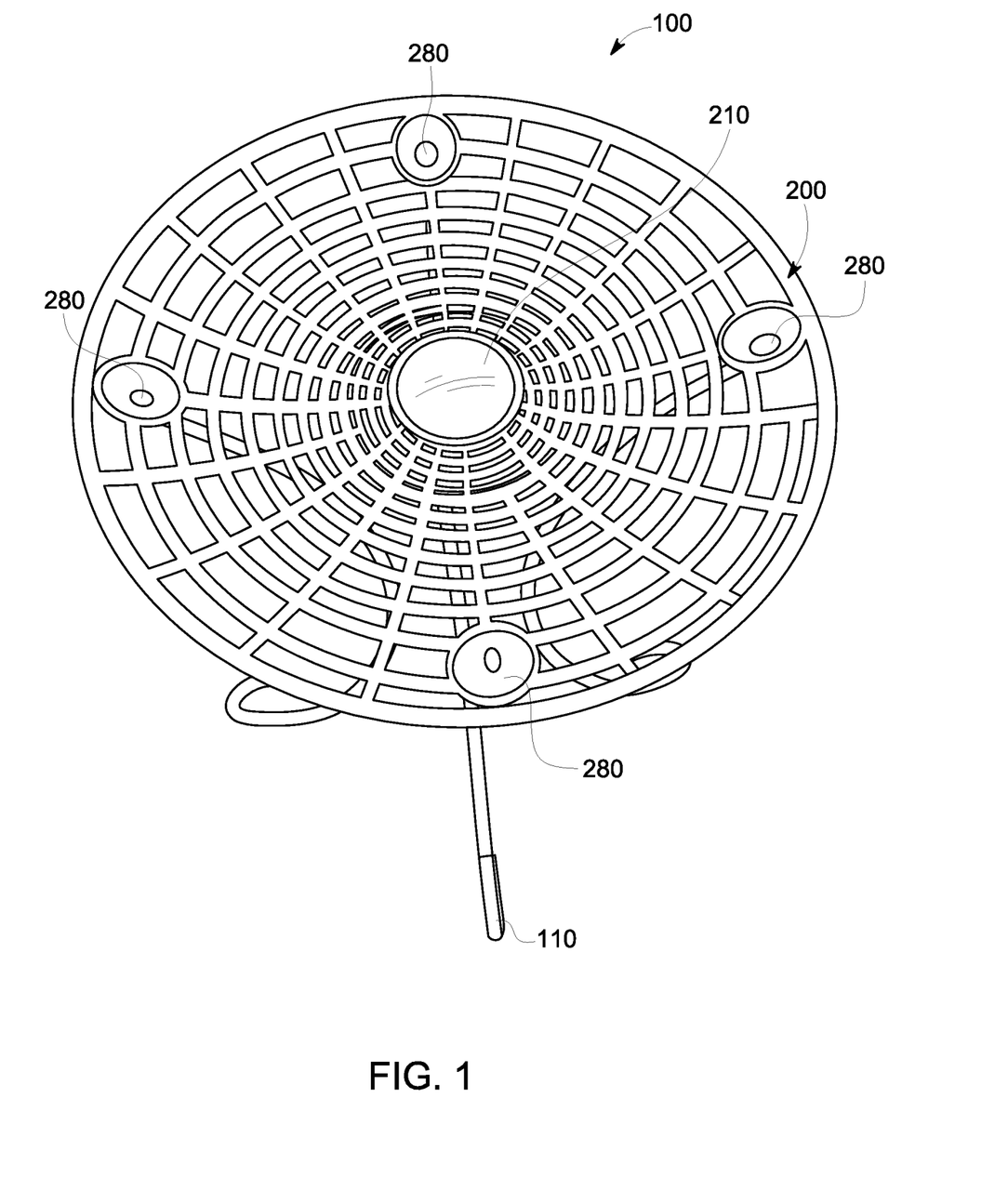
FIG. 1 illustrates a perspective view of a bird bath in accordance with the various teachings of the present disclosure.
Figure 2:
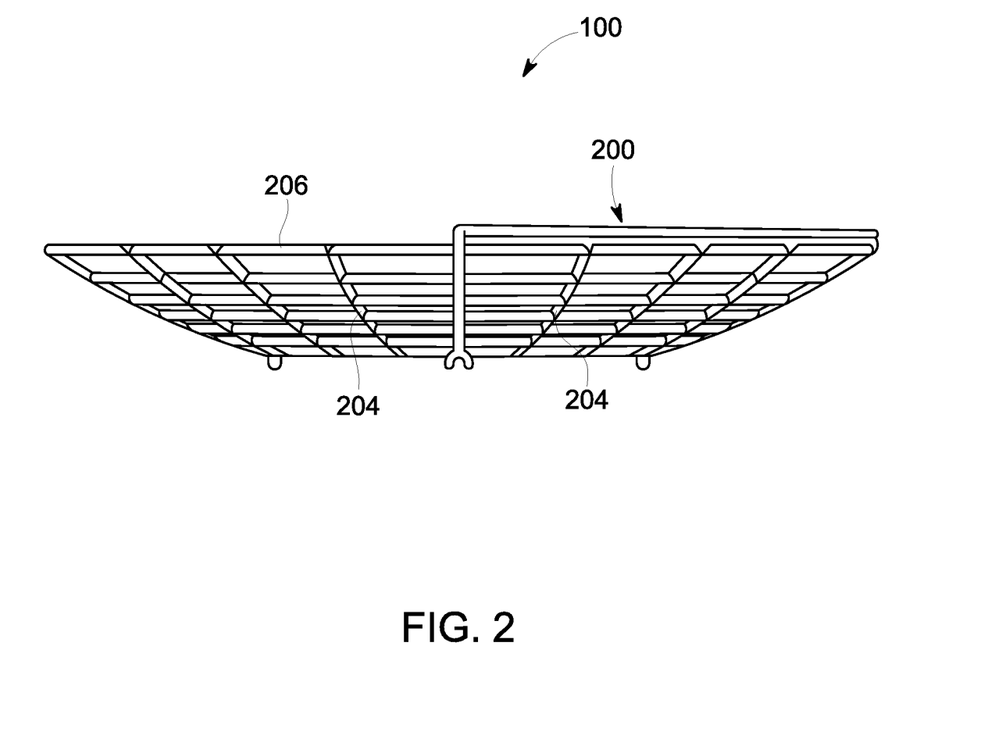
FIG. 2 illustrates a side view of a portion of the bird bath in accordance with the various teachings of the present disclosure.
Figure 3:
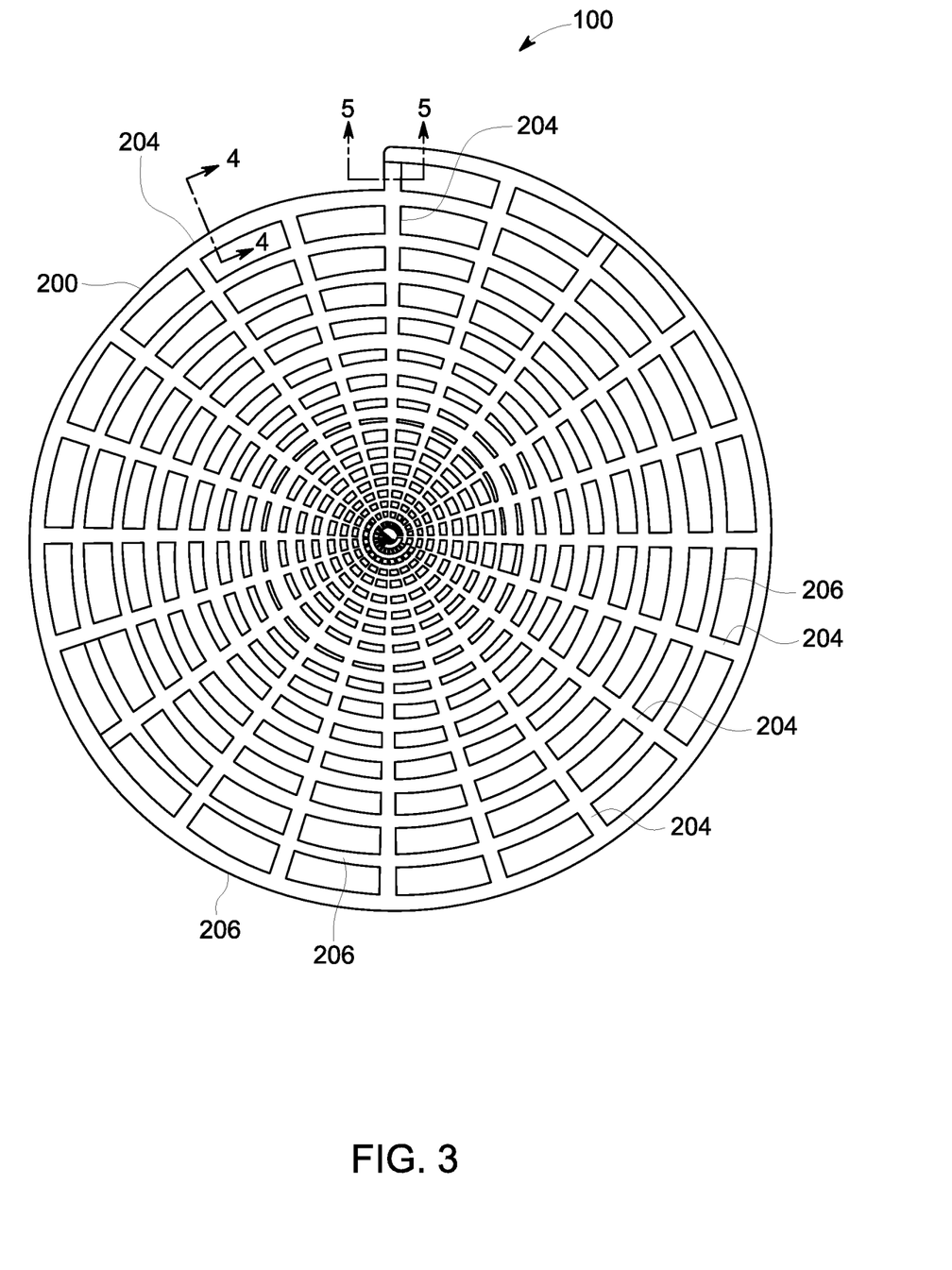
FIG. 3 illustrates a top view of the portion of the bird bath in accordance with the various teachings of the present disclosure.
Figure 4:
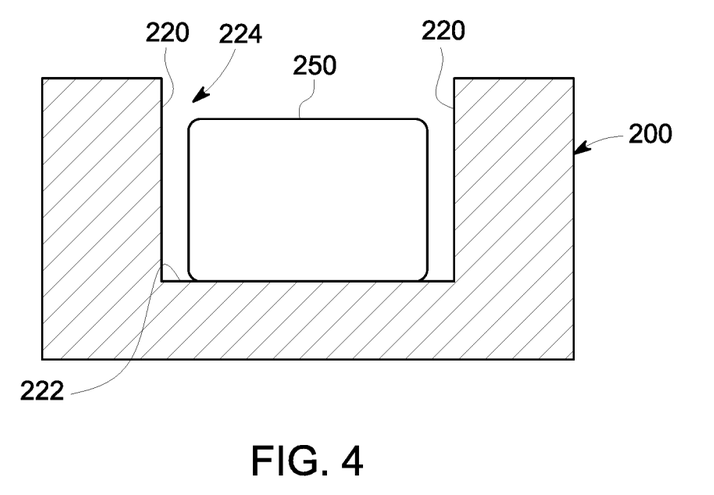
FIG. 4 illustrates a cross-sectional view of a spiral frame member taken along line 4-4 in FIG. 2 in accordance with the various teachings of the present disclosure.
Figure 5:
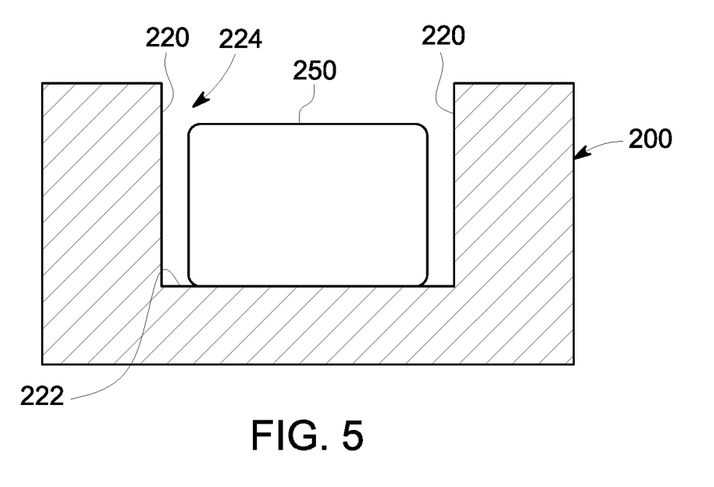
FIG. 5 illustrates a cross-sectional view of a radial frame member taken along line 5-5 in FIG. 2 in accordance with the various teachings of the present disclosure.
Figure 6:
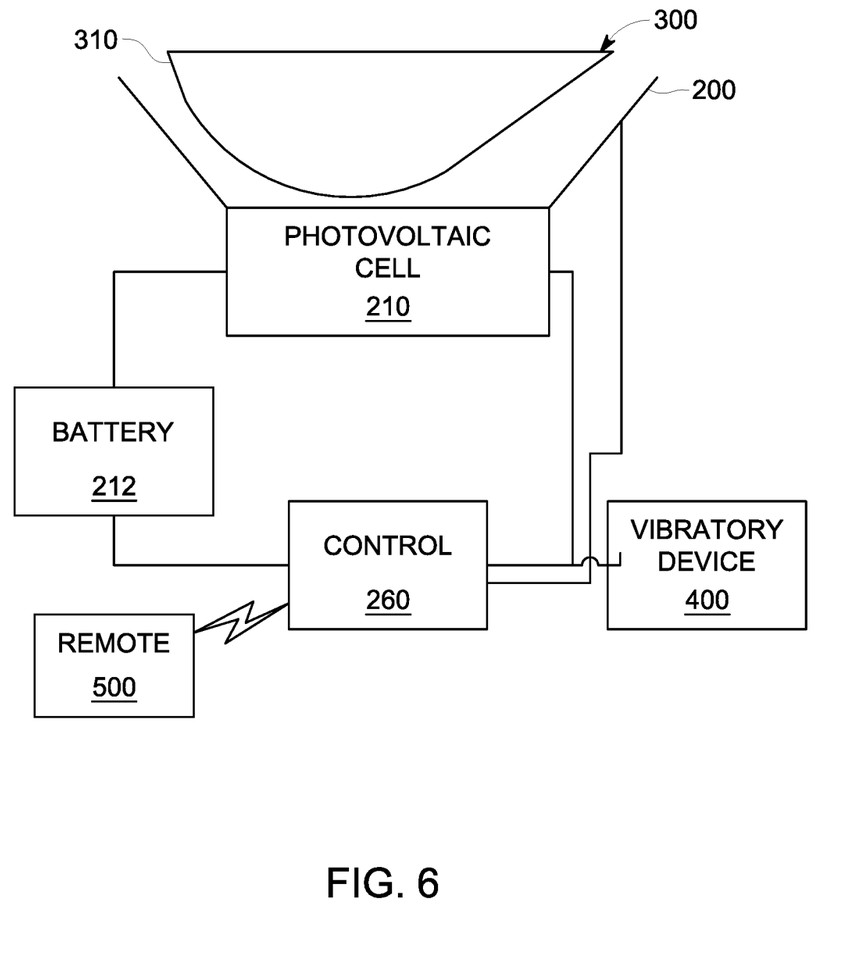
FIG. 6 illustrates a schematic diagram of control/power circuit in FIG. 2 in accordance with the various teachings of the present disclosure.
Figure 7:
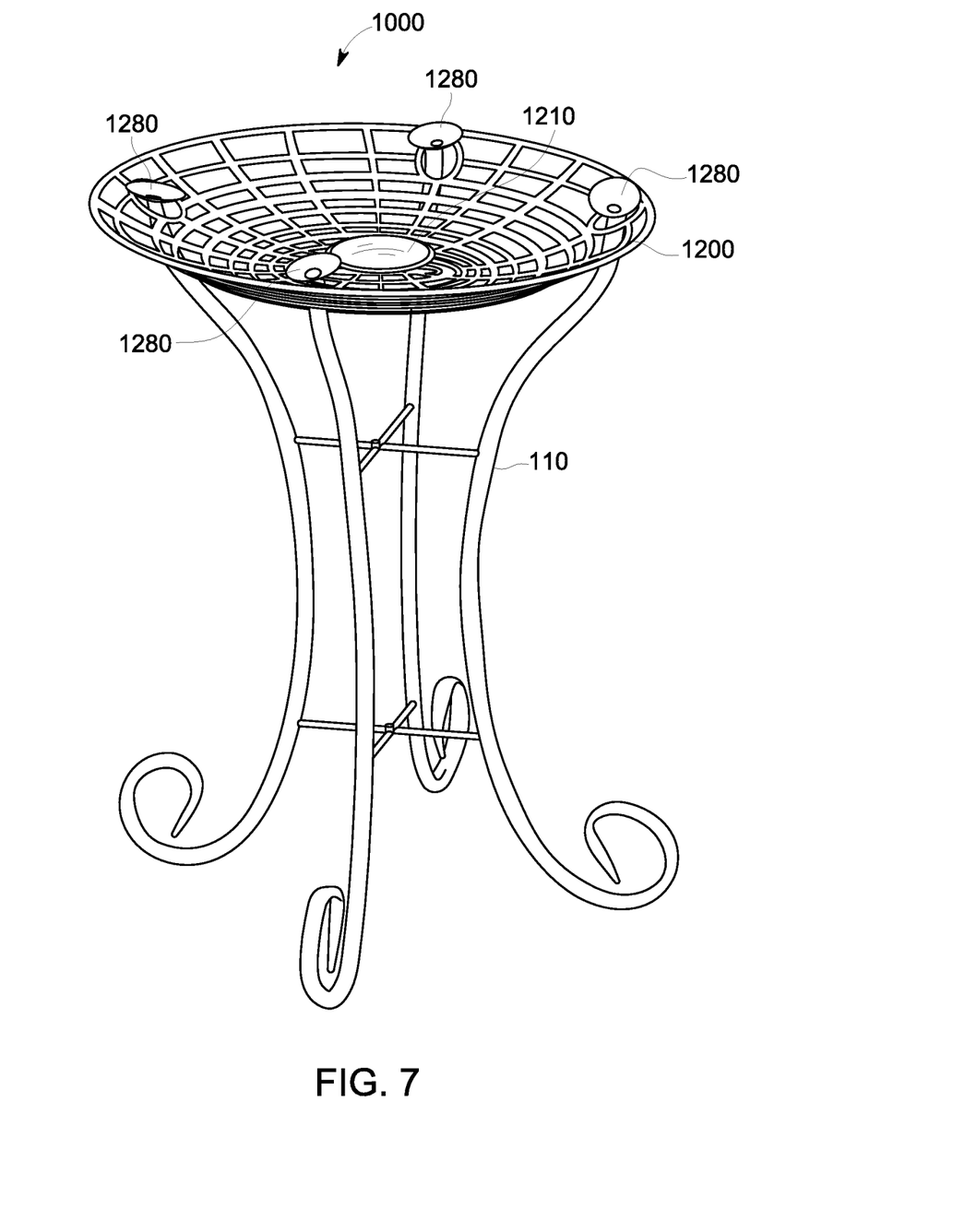
FIG. 7 illustrates a perspective view of an alternative construction of bird bath in accordance with the various teachings of the present disclosure.
Figure 8:
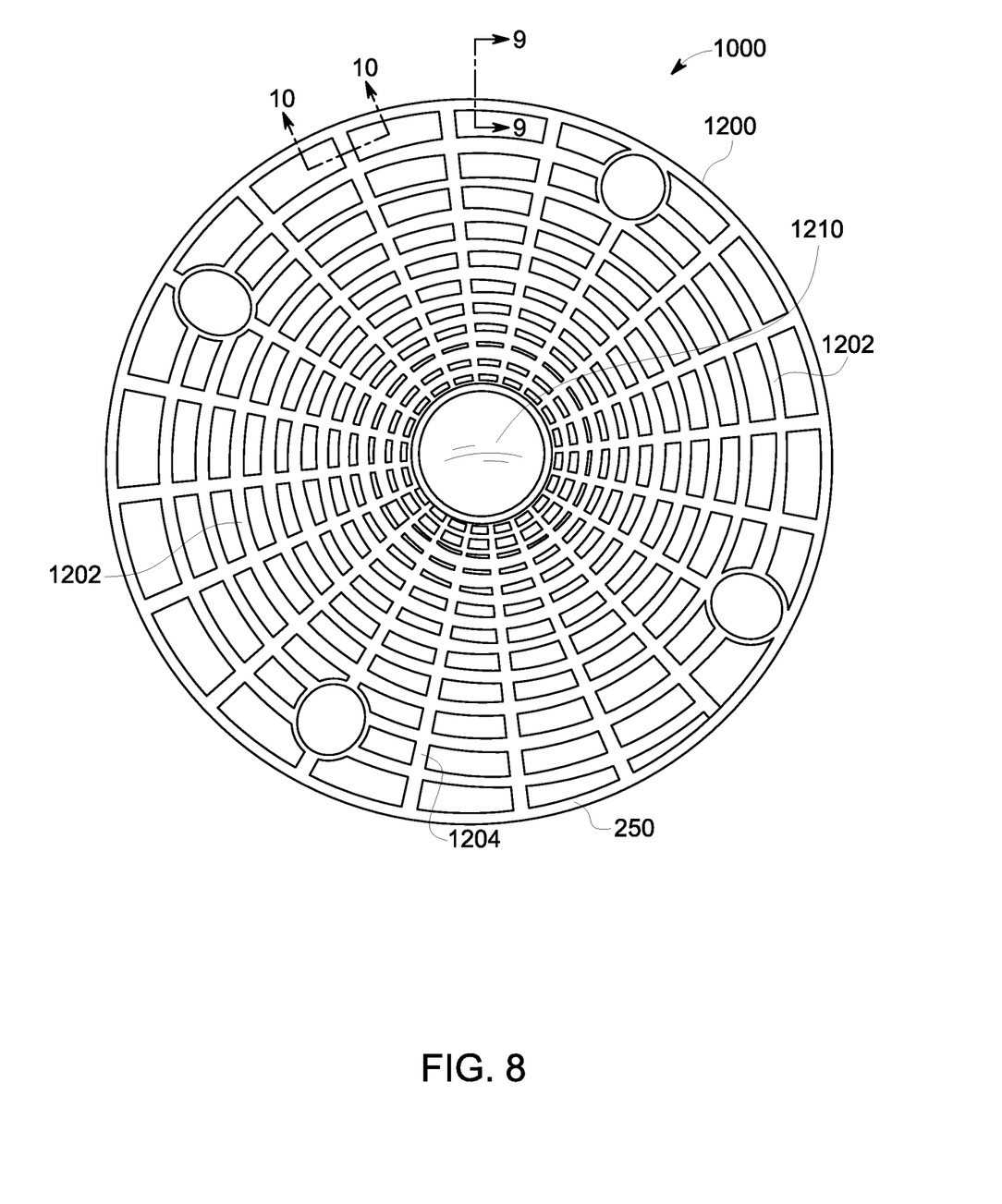
FIG. 8 illustrates a top view of a portion of the alternative construction of a bird bath in accordance with the various teachings of the present disclosure.

In reference to FIGS. 4 and 5, the spiral frame members 206 or circle frame members 1202 (FIGS. 7 and 8) may have an open channel configuration, in which there are sidewalls 220 extending upward from a base 222 to form an open pathway 224 in which lighting, such as LED lights 250, are disposed therein. Seed string lights 250 (LED lights) can extend into the spiral frame member system in the open channel pathway 224. In one configuration, the seed string lights 250 include a series of LED lights along an electrical wire. In another configuration, the seed string lights 250 include a series of mini-lights along an electrical wire. In one construction, one or more the spiral frame members 206 can have the seed string lights 250 disposed within the pathway 224 circumference of the spiral frame member 206. In another construction, a majority (3-4 members, 5-6 members) or more of the spiral frame members 206 can have the seed string lights 250 disposed within the pathway 224 circumference of the spiral frame member 206. These LED lights 250 are connected to a control mechanism 260 which controls the illumination and initiation of the lights and light sequences in another construction. The frame includes spiral frame members 206 and also includes radiating extensions members 204, 1204 (e.g., radial type members). The radial members 204, 1204 originate and radiate from the basin center and extend towards the upmost edge of the frame 200, 1200. The spiral frame members 206 are connected through radial members 204 and radial members 204 may have an open channel configuration shown in FIG. 5. The spiral frame members 1202 may have an open channel configuration shown in FIG. 4. The channel configuration has two opposing sidewalls 220 and a base 222 in which LED lights 250 can be provided inside the open channel 224 to provide illumination to the basin. In one construction, one or more of the radial members 204 can have the seed string lights 250 disposed within pathway 224 as shown in FIG. 5 such that the lights 250 originate and radiate from the basin center and extend towards the upmost edge of the frame 200.

Figure 9:
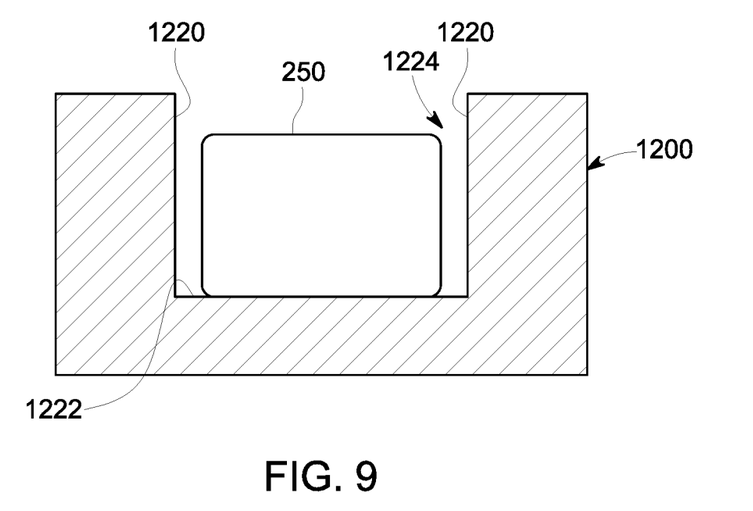
FIG. 9 illustrates a cross-sectional view of a circular frame member taken along line 9-9 in FIG. 8 in accordance with the various teachings of the present disclosure.
Figure 10:
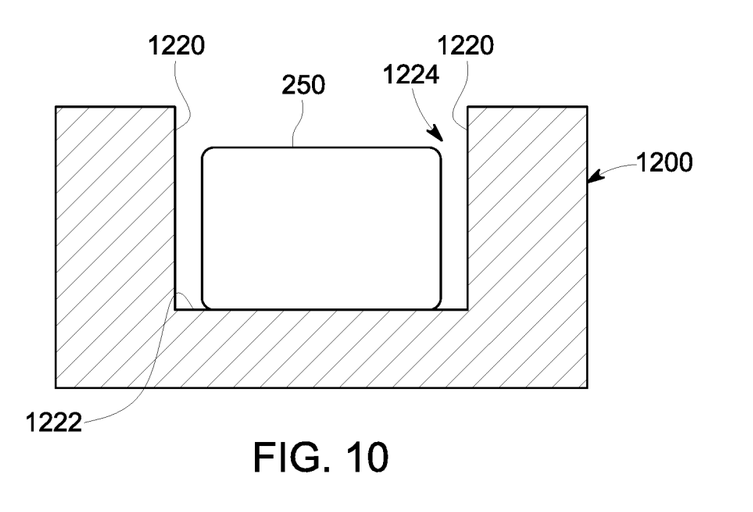
FIG. 10 illustrates a cross-sectional view of a radial frame member taken along line 10-10 in FIG. 8 in accordance with the various teachings of the present disclosure.

In the alternative construction of FIGS. 7-10, the circular frame members 1202 are connected through radial members 1204 may have an open channel configuration shown in FIG. 9. And the radial members 1204 may have an open channel configuration shown in FIG. 10. Referring to FIGS. 9 and 10, the open channel configuration has two opposing sidewalls 1220 and a base 1222 in which LED lights 250 can be provided inside the open channel 1224 to provide illumination to the basin. In another construction, the spiral frame members 206 or circular frame members 1202 (FIGS. 7 and 8) may have a tubular channel pathway configuration in with the lights 250 are disposed in an open tube, in which there are sidewalls 1220 extending upward from a base 222 and a top portion extends between the sidewalls 1220 to form an enclosed pathway 1224 in which lighting, such as LED lights 250, are disposed therein. In one construction, one or more the circular frame members 1202 can have the seed string lights 250 disposed within pathway 1224 the circumference of the circular frame members 1202. In another construction, a majority (3-4 members, 5-6 members) or more of the circular frame members 1202 can have the seed string lights 250 disposed within the pathway 224 circumference of the circular frame members 1202. In one construction, one or more of the radial members 1204 can have the seed string lights 250 disposed within pathway 1224 as shown in FIG. 10. In such a construction, the seed string lights 250 originate and radiate from the basin center and extend towards the upmost edge of the frame 1200.

In one construction, the removable basin 300 may be connected to the frame 200, 1200 by a releasable connection mechanism, such as a suction mechanism. The suction mechanism may include a plurality of suction cups 280, 1280 in which the basin body 310 can be press fitted into the suction cups 280, 1280 and is also supported by the spiral frame 200, 1200 so that the basin 300 will continually stay connected to the frame. The suction cups 280, 1280 employ the negative fluid pressure of air to adhere to a nonporous surface of the basin 300 to create a partial vacuum. This configuration provides for strong fit of the basin 300 for solar powered bird bath 100 in normal use.

The system, in one construction, basin 300 can be made of a transparent type of material, such as a plastic material so that the sunlight (solar light) can pass through the thickness bottom of basin 300 to the solar cell 210 that is located underneath the basin 300. Additionally, the basin 300 being translucent or transparent, it is able to glow or light-up due to the LED lights 250 located within the spiral frame system, 200 so that during a nighttime operation, the LED illuminated in the basin to attract birds. This configuration enables basin 300 to enable light to pass through the thickness by being constructed from a light transmissive material. This configuration creates lighting feature in combination with lighting system and can provide a visual striking appearance of basin, frame and birds at night of in low light conditions.

In another construction, a solar powered bird bath 100 may include a vibratory system 400 which provides periodic movement to the frame and basin. The vibratory system 400 is electrically connected and controlled by the control system shown in FIG. 6. The vibratory system 400 may include a several configurations or arrangements. In one vibratory configuration, an eccentric rotating mass vibration motor uses a small unbalanced mass on a DC motor when it rotates it creates a force that translates to vibrations. Other vibratory configurations may be a linear resonant actuator (LRA) which contains a small internal mass attached to a spring, which creates a force when driven. These vibratory configurations may be mounted to the frame 200, 1200 to provide vibrations the basin and frame.

In another construction, a solar powered bird bath 100 may include a wireless remote control 500 for the control system to energize the LED lights in the frame. In this construction, the control system may include a receiver for receiving wireless signals from a remote control 500. The receiver may have a built-in antenna for this purpose. The wireless signal may be provided according to any desired encoding and modulating scheme, including radio frequency, WIFI and the like.

Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A bird bath, comprising:
   a frame having:
      a plurality of frame members comprising one of (i) a plurality of spiral frame members, (ii) a plurality of radial members each having a channel pathway for receiving a lighting element, or (iii) a plurality of spiral frame members and a plurality of radial members, each radial member having a channel pathway for receiving a lighting element; and
      a plurality of lighting elements, each lighting element disposed in a respective frame member of the plurality of frame members;
   a stand for supporting the frame;
   a control component for controlling the lighting elements; and
   a photovoltaic cell for providing power to the plurality of lighting elements.

2. The bird bath according to claim 1, wherein the frame has a plurality of spiral frame members and wherein the spiral frame members have a channel pathway and the lighting elements are disposed in the channel pathway.

3. The bird bath according to claim 1, further comprising a detachably attachable basin configured to interact with the frame.

4. The bird bath according to claim 3, wherein the bird bath further comprises a suction cup for maintaining the detachably attachable basin on the frame, or wherein the detachably attachable basin comprises a light transmissive material.

5. The bird bath according to claim 1, further comprising a wireless remote control for controlling the control component.

6. The bird bath according to claim 1, further comprising a rechargeable battery electronically connected to the control component and the photovolatic cell.

7. The bird bath according to claim 1, further comprising a removable basin of light transmissive material and the photovoltaic cell being disposed underneath the basin.

8. A bird bath comprising:
   a frame having:
      a plurality of frame members including a plurality of circular members; and
      a plurality of lighting elements, each lighting element disposed in a respective frame member of the plurality of frame members;
   a stand for supporting the frame;
   a control component for controlling the lighting elements; and
   a photovoltaic cell for providing power to the plurality of lighting elements.

9. A bird bath comprising:
   a frame having:
      a plurality of frame members;
      a plurality of lighting elements, each lighting element disposed in a respective frame member of the plurality of frame members; and
      a vibratory device;
   a stand for supporting the frame;
   a control component for controlling the lighting elements;
   a photovoltaic cell for providing power to the plurality of lighting elements; and
   a light transmissive basin detachably mounted on the frame, wherein the vibratory device is configured for vibrating the frame with the basin.

10. A bird bath comprising:
    a frame having:
       a plurality of frame members; and
       a plurality of lighting elements, each lighting element disposed in a respective frame member of the plurality of frame members;
    a stand for supporting the frame;
    a control component for controlling the lighting elements;
    at least one of (i) a plurality of suction cups for holding a basin thereon and (ii) a vibratory device for vibrating the frame; and
    a photovoltaic cell for providing power to the plurality of lighting elements.

11. The bird bath according to claim 8, wherein the circular members have a channel pathway and the lighting elements being disposed in the channel pathway.

* * * * *